United States Patent [19]

O'Keeffe et al.

[11] Patent Number: 4,967,475
[45] Date of Patent: *Nov. 6, 1990

[54] ALL-WAY OFFSET SNIPS CUTTING TOOL WITH FULL WIDTH WIRE CUTTER

[75] Inventors: James R. O'Keeffe, Hastings; Gary Petersen; Burrell T. Burney, both of DeWitt, all of Nebr.

[73] Assignee: Prosnip Corporation

[*] Notice: The portion of the term of this patent subsequent to Aug. 7, 2001 has been disclaimed.

[21] Appl. No.: 253,317

[22] Filed: Sep. 30, 1988

Related U.S. Application Data

[63] Continuation of Ser. No. 619,191, Jun. 11, 1984, abandoned.

[51] Int. Cl.$^5$ ............................................. B26B 13/00
[52] U.S. Cl. ............................................. 30/252; 30/259
[58] Field of Search ................. 30/252, 259, 266, 254, 30/226, 256, 175, 176, 226, 248; 76/104; 7/130, 131

[56] References Cited

U.S. PATENT DOCUMENTS

| | | | |
|---|---|---|---|
| 540,464 | 6/1895 | Stockman . | |
| 894,710 | 7/1908 | Selley . | |
| 942,043 | 11/1909 | Searight | 30/251 |
| 1,436,603 | 11/1922 | Philbert | 30/258 |
| 1,632,284 | 6/1927 | Gardiner | 30/257 |
| 2,078,585 | 4/1937 | Rauh | 30/254 |
| 2,163,088 | 6/1939 | Grant | 30/258 |
| 2,264,840 | 12/1941 | Issac | 30/254 |
| 2,286,874 | 6/1942 | Schwartz | 76/104 |
| 2,307,457 | 1/1943 | Franko | 30/257 |
| 2,395,897 | 3/1946 | Kethcart | 30/230 |
| 2,604,695 | 7/1952 | McGary et al. | 30/250 |
| 2,682,795 | 7/1954 | Neal | 30/250 X |
| 2,690,010 | 9/1954 | Keller | 30/252 |
| 2,759,521 | 12/1951 | Sorensen | 30/230 |
| 2,766,526 | 10/1956 | Pape | 30/252 |
| 2,803,058 | 8/1957 | Mead | 30/252 |
| 2,869,235 | 1/1959 | Klenk | 30/252 |
| 2,908,076 | 10/1959 | Veith | 30/227 |
| 2,931,100 | 4/1960 | Wertepny | 30/258 |
| 3,143,799 | 8/1964 | Gover | 30/259 |
| 3,461,555 | 8/1969 | Bliznak | 30/254 |
| 3,587,173 | 6/1971 | Hexdall | 30/251 |
| 3,678,580 | 7/1972 | Duffy | 30/267 |
| 3,740,846 | 6/1973 | Duffy | 30/267 |
| 3,839,794 | 10/1974 | Deale | 30/248 X |
| 4,463,497 | 8/1984 | O'Keeffe | 30/252 |
| 4,502,222 | 3/1985 | Sargent | 30/251 |

FOREIGN PATENT DOCUMENTS 64977 3/1982 Fed. Rep. of Germany .

OTHER PUBLICATIONS

Midwest Tool and Cutlery Company Catalog (NPC82/1436) illustrating Aviation Snips (4 pages). Ernst Diener Catalog, Brochures and Pricing Sheet (13 pages) dated Feb. 15, 1975, Feb. 16-19, 1976, and '68 (1968) illustrating Erdi or Diener offset Snips Model 27A.

Primary Examiner—Frank T. Yost
Assistant Examiner—Willmon Fridie, Jr.
Attorney, Agent, or Firm—Lackenbach Siegel Marzullo & Aronson

[57] ABSTRACT

An improved all-way offset snips with full width wire cutter has bosses through which first and second blade members are pivotably connected for rotation about an axis perpendicular to the pivot bosses. The blade members have extended offset cutting surfaces with respect to the pivot bosses to permit the cutting of irregular shapes, particularly sharp curves and especially small circles, including opposing circles of about 2.0" to 2.5" diameters. The cutting surfaces are rotatable between an open position and a closed position for cutting the sheet material therebetween. The pivot bosses and the cutting surfaces are adapted for removal of material therefrom to permit resharpening of the offset snips while maintaining the offset of the cutting surfaces. The shanks of the blade members are also provided with wire cutting means, preferably a pinch cutter capable of being a limit stop for limiting rotation of the first and second blade members. Also, an improved handle configuration with improved toggle means provides greater power.

13 Claims, 4 Drawing Sheets

ALL-WAY OFFSET SNIPS CUTTING TOOL WITH FULL WIDTH WIRE CUTTER

This application is a continuation of application Ser. No. 619,191, filed June 11, 1984, now abandoned.

This application is related to applicant's copending U.S. patent application, Ser. No. 386,049, filed on June 7, 1982 by James R. O'Keefe as inventor and entitled "Improved Offset Snips" now U.S. Pat. No. 4,463,497.

BACKGROUND OF THE INVENTION

The present invention relates to an improved hand operated offset shears or snips which can be used for cutting sheet metal or similar material in either a straight line or in a right or left hand direction, including circle cuts down to an opposing circle of about 2.0" to 2.5" in diameter.

When sheet metal or similar material is cut with conventional snips, one or both edges of the cut sheet material may interfere with the body of the snips, making it difficult to advance the snips into the sheet material and distorting the cut edges. This interference is greatest when cutting irregular shapes, particularly sharp curves and especially small circles. Accordingly, conventional snips are often supplied in mirror image configurations particularly adapted for either left-hand or right-hand turning cuts. Also, when conventional snips are used to cut thick, tough or stiff material, the sheet material may tend to slide away from the blades as they are closed, decreasing the efficiency of the cutting. Further, conventional snips may require long handles and substantial force to be exerted by the operator in order to cut many sheet materials.

As illustrated by U.S. Pat. No. 2,264,840, one approach to decreasing the interference of the cut sheet material with the body of the snips is to offset the cutting surfaces with respect to the shank portions of the snips such that the cut sheet material passes to one side of the shank portions. Also illustrated therein is the practice of extending the cutting blades laterally approximately at right angles to the place of operation of the shanks. This configuration facilitates the advancement of the snips into the sheet material by reducing the extent to which the cut sheet material must be spread vertically to pass above and below the lower blade, thereby decreasing the tendency of the sheet material to slide away from the cutting surfaces. More recently, a link arrangement, as shown in U.S. Pat. No. 3,587,173, has been proposed to reduce the force required by the operator to cut heavy sheet materials.

As with conventional snips, most available offset snips generally can be used only in cutting curves either in the left-hand or right-hand direction, thus requiring other offset snips having a mirror image configuration when curves must be made in the other direction. Also, the laterally extending blades of available offset snips must be carefully ground and aligned during manufacture and, generally, cannot be conveniently reground if they become dull or damaged. Abuse of the blades by cutting wire or similar materials may render the snips useless for cutting sheet material. Accordingly, a need exists for improved offset snips which can be easily resharpened if the blades become dull or damaged, and which embodies a pinch or shear type wire cutter. Further, there is a need for an improved handle and toggle arrangement or configuration making the offset snips more powerful and convenient to use when cutting heaving sheet material.

In applicant's related U.S. patent application, a pinch type cutter is employed where part of the upper blade member serves as the anvil and a portion of the lower blade member serves as the chisel for the wire cutter. With such an arrangement, a "relief" formed at the base of the cutter elements, due to the manufacturing processes involved, requires wire that is to be cut to be specifically positioned substantially centrally in the cutter. Should, for example, a small diameter wire be positioned at the base of the cutter, the "relief" in effect precludes the wire from being cut by the chisel and anvil. This "relief" is created as a result of the various grinding operations or passes required in order to grind the opposite faces of the chisel. Also, in the formation of the chisel of such related patent application, the grinding passes generally create a broad V-shaped chisel having an angle between the sides thereof of about 70 degrees. Such an angular chisel configuration, although adequate for most applications, requires more difficult manufacturing processes to fabricate resulting in considerably higher product cost. It also requires higher pressures and forces to cut wire as the chisel has a broader cutting angle and wire of smaller and even larger gauges can easily become snagged or trapped at the base of the cutter in the "relief" area. Such an occurrence then makes it difficult to cut the wire and one must manually reposition the wire centrally so that the chisel cuts or pinches across the full width of the wire with the wire trapped squarely between the anvil and full face width of the chisel.

Another disadvantage of applicant's related patent application is the fact that the lower blade member, although offset, does not provide adequate clearance so that very small opposing diameter circle cuts cannot be made. This deficiency makes it necessary to fabricate and stock both left and right hand cutters as neither offset snips is truly considered an all-way or universal type of snips capable of cutting in any direction, that is, straight, right-hand and left-hand. It should be recognized that for most applications, cutting arcs, curves, or circles down to at least about 2.0" to 2.5" in diameter would satisfy most field requirements of the tool.

It is therefore an object of the present invention to provide improved all-way offset snips which can cut sheet material in both left-hand and right-hand curves, as well as in very small diameter circles, without being impeded by interference of the cut material with the body of the snips.

It is a further object of the present invention to provide improved all-way offset snips of increased power and in which the cutting surfaces may be conveniently and economically resharpened if the cutting surfaces become dull or damaged, and resharpening of the chisel of the wire cutter can be done by a single grinding pass with the boss of its blade member.

It is a further object of the present invention to provide improved all-way offset snips having either pinch or shearing means for cutting wire and the like, thereby eliminating the need for a second tool and reducing the abuse of the sheet material cutting surfaces of the offset blade members.

It is a further object of the present invention to provide improved all-way offset snips having substantially increased power due to a toggle arrangement which provides greater force action to the central toggle pivot of a dual link/three pivot point toggle linkage because of the general linearity of the toggle pivot points when the offset snips is in closed position.

It is still a further object of the present invention to provide an "all-way" offset snips having handles with a toggle linking arrangement of considerably greater power which can more easily be grasped when the snips are in the open position and more easily forced to the closed position.

It is yet another object of the present invention to provide an all-way offset snips having either a pinch or shear type cutter, with the anvil portion of the pinch cutter on the upper blade member and the chisel on the lower blade member regardless of the type of cutter which is employed.

It is still yet another object of the present invention to provide an all-way offset snips having a chisel which can be sharpened in a single grinding pass with the boss of its blade member and which cuts across the full width of the anvil.

SUMMARY OF INVENTION

The present invention is directed to improvements in hand operated all-way shears or snips with full width wire cutting means for cutting sheet material and wire or other rod-like materials.

According to an aspect of this invention, first and second blade members have pivot bosses through which a pivot means pivotably connects the blade members for rotation about an axis perpendicular to the pivot bosses. The respective blade members have first and second cutting surfaces which are offset with respect to the plane of the respective pivot bosses. Upon rotation of the blade members about the pivot means, the first and second cutting surfaces are moveable between an open position and a closed position for cutting sheet material therebetween. The pivot bosses and the cutting surfaces are adapted for removal of material therefrom so as to provide resharpened cutting surfaces while maintaining the offsets between the respective pivot bosses and the cutting surfaces. At the same time of resharpening the chisel of the wire cutter, a pivot boss is also ground down to the desired size. The offsets of the cutting surfaces with respect to the pivot bosses is a minimum of about 0.250" to 0.375" so as to permit previously cut material to pass the blade members without interference and to permit the cutting of very small diameter opposing circle cuts.

According to another aspect of this invention, first and second blade members are pivotably connected through shank portions, one of the shank portions being provided with a recess substantially in the plane of the sheet material to be cut. The respective blade members have first and second cutting surfaces which are provided with extended offsets with respect to the shank portions and which are movable upon rotation between an open position and a closed position for cutting the sheet material therebetween. A cut edge of the cut sheet material is receivable in the recess so as to permit cutting of the sheet material along both left-hand and right-hand curves. As a result, the offset snips of the present invention are "universal", truly eliminating the need for separate right-hand and left-hand snips when irregular cuts are required.

According to another aspect of this invention, the handles are pivotable to provide particularly favorable toggle leverage throughout the cutting stroke, whereby the center toggle point about which the forces are generated to achieve powerful locking of the tool is accomplished by positioning same substantially in line just about shy of the "over center" toggle position with the pivot bolts providing the articulated movement of the blade members with respect to the handles. Other aspects of the invention include an improved integral cutting means suitable for cutting wire and an integral locking means for maintaining the cutting blades in the closed position. The invention, together with further objects and attendant advantages, will be best understood by reference to the following detailed description, particularly when taken in conjunction with the accompanying drawings.

DETAILED DESCRIPTION OF THE PREFERRED EMBODIMENTS

Figures 1, 2, 3:
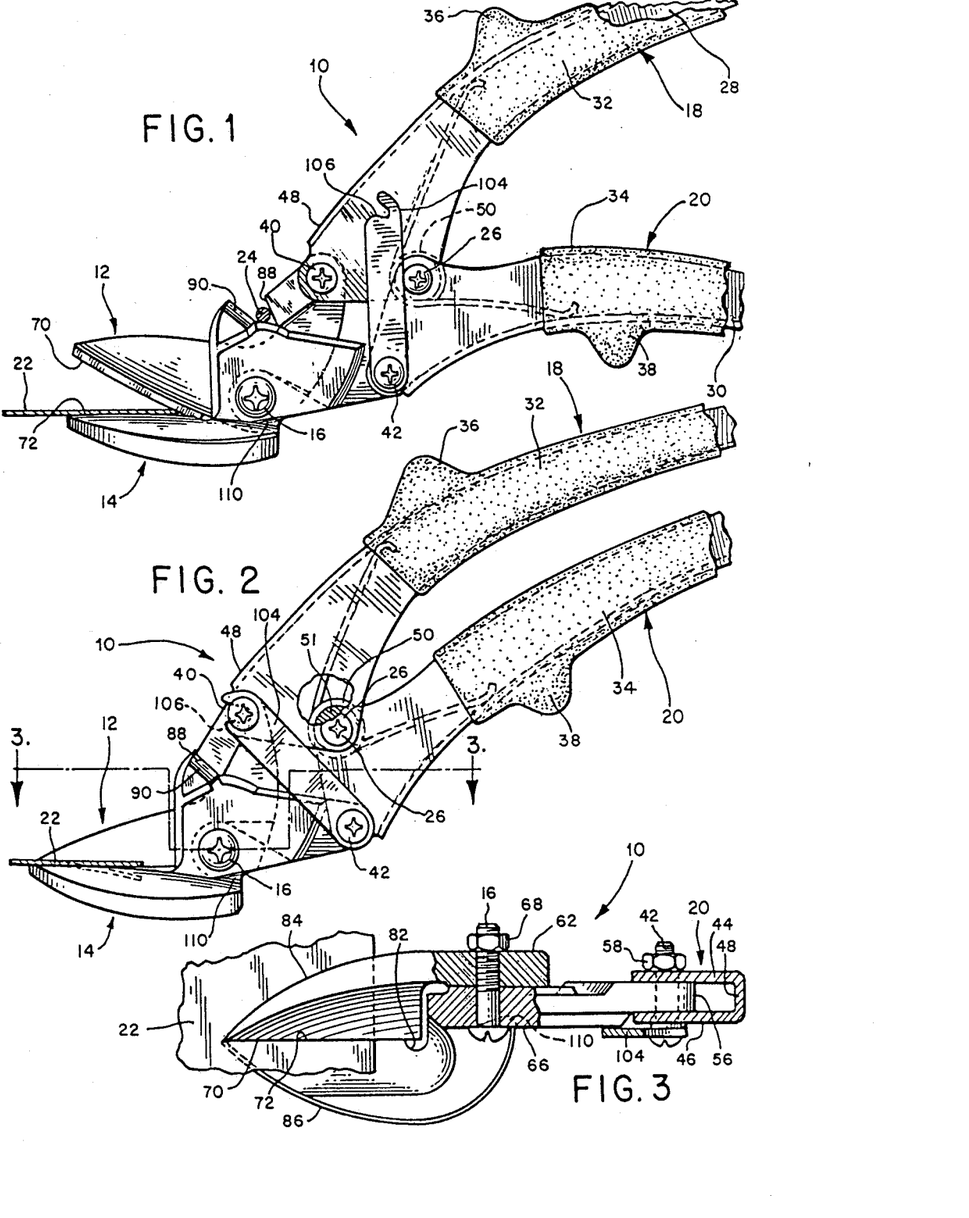
FIG. 1 is a side elevational view of an embodiment of the offset snips of the present invention shown in the open position and with portions broken away.
FIG. 2 is a side elevational view of the offset snips of FIG. 1 shown in the closed or cutting position and with portions broken away.
FIG. 3 is a sectional view of the offset snips of FIGS. 1 and 2 taken along the line of 3—3 of FIG. 2.

With reference to the drawings, one embodiment of offset snips made in accordance with the present invention is indicated generally by the numeral 10 in FIGS. 1 to 3. The cutting snips 10 include upper and lower blade members, indicated generally by the numerals 12 and 14, respectively, which are pivotably moveable about a main blade-to-blade pivot bolt 16 by upper and lower handles, indicated generally by the numerals 18 and 20, respectively. Movement of the blade members 12 and 14 between the open position shown in FIG. 1 and the closed position shown in FIG. 2 effects cutting of a sheet material workpiece 22 or a wire workpiece 24 positioned between the blade members 12 and 14, as shown in FIG. 1.

The handles 18 and 20 are pivotably moveable about a handle-to-handle pivot bolt 26 located intermediately of the ends of the handles 18 and 20. The rearward portions 28 and 30 of the respective handles 18 and 20 are covered with upper and lower hand grips 32 and 34, respectively. Preferably, the hand grips 32 and 34 are formed by dipping or molding so as to include outwardly projecting ear portions 36 and 38, respectively, to prevent the hand of the operator from sliding forward during use of the cutting snips 10. The preferred material for the hand grips 32 and 34 is a hot-dip plastisol such as that commercially available from Sinclair Rush of St. Louis, Mo.

The handles 18 and 20 extend forward from the handle pivot bolt 26 and away from each other for pivotable mounting to the blade members 12 and 14 at pivot bolts 40 and 42, respectively. In the open position shown in FIG. 1, an cute angle is, preferably, formed between an imaginary line joining the pivot bolts 26 and 40 and an imaginary line joining pivot bolts 26 and 42. Preferably, the handles 18 and 20 have a U-shaped cross-section, as shown in FIG. 3, formed by laterally spaced side portions 44 and 46 joined by a web portion 48. An omega spring 50, held in place by the handle pivot bolt 26, engages the web portion 48 of the handles 18 and 20 to bias the cutting snips 10 into the open position. Other biasing means could be employed with similar effect. A sleeve 51 is positioned between the handle pivot screw 26 and the omega spring 50 to center and space the omega spring 50 with respect to the handle pivot screw 26. Although the sleeve 51 is not essential to the operation of the cutting snips 10, Applicant has found that the sleeve 51 substantially extends the cycle life of the omega spring 50.

In the open position, the upper blade member 12 extends upward to form a shank and rearward from the main blade-to-blade pivot bolt 16 to a pivotable mounting upon the handle-to-handle pivot bolt 40, as shown in FIG. 1. The lower blade member 14 extends rearward from the main pivot bolt 16 to a pivotable mounting upon the pivot bolt 42. In response to the closing of the handles 18 and 20, the pivot bolts 40 and 42 are rotated about the handle pivot bolt 26, thereby spreading the rearward portions 54 and 56 of the blade members 12 and 14. As illustrated in FIG. 3, the rearward portions 54 and 56 have sufficient thickness to be closely received by the side portions 44 and 46 of the handles 18 and 20 so as to maintain alignment of the upper and lower cutting blades 12 and 14. Adjustment of the play between the side portions 44 and 46 and the rearward portions 54 and 56 is provided by adjustment nuts 58 upon the pivot bolts 40 and 42.

The main pivot bolt 16 is threaded into a hole 60 in the shank portion 62 of the upper blade member 12 and forms a sliding fit with a hole 64 within the shank portion 66 of the lower blade member 14. A lock nut 68 is locked against the shank portion 62 to maintain the adjusted length of the main pivot bolt 16. Cutting surfaces 70 and 72 of the cutting blades 12 and 14, respectively, are within a plane substantially parallel to but offset laterally from the adjoining shank portions 62 and 66 of the respective blade members, as shown in FIG. 3. It will be noted that the offset is sufficient to permit a cut portion of the sheet material workpiece 22 to pass to the side of the shank portion 66.

Figure 4:
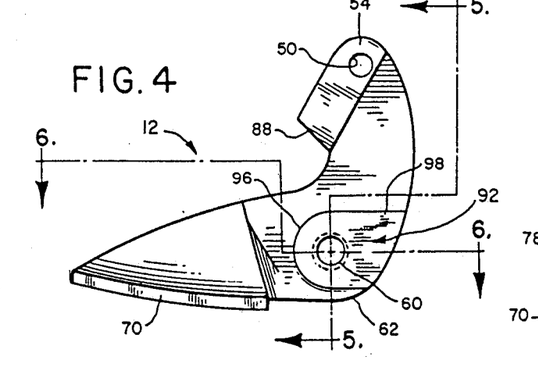
FIG. 4 is a side elevational view of the upper cutting blade of the offset snips of FIGS. 1 to 3.
Figure 5:
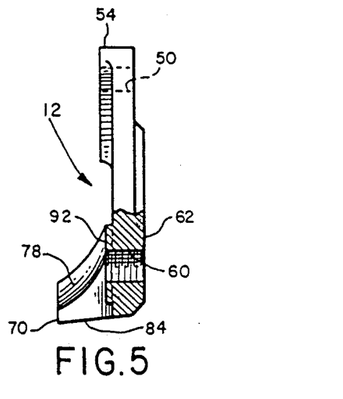
FIG. 5 is a sectional view of the upper cutting blade of the offset snips of FIGS. 1 to 3 taken along the line 5—5 of FIG. 4.
Figure 6:
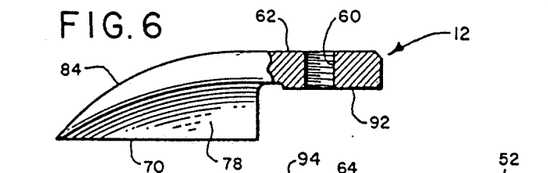
FIG. 6 is a sectional view of the upper cutting blade of the offset snips of FIGS. 1 to 3 taken along the line 6—6 of FIG. 4.
Figures 7, 8, 9:
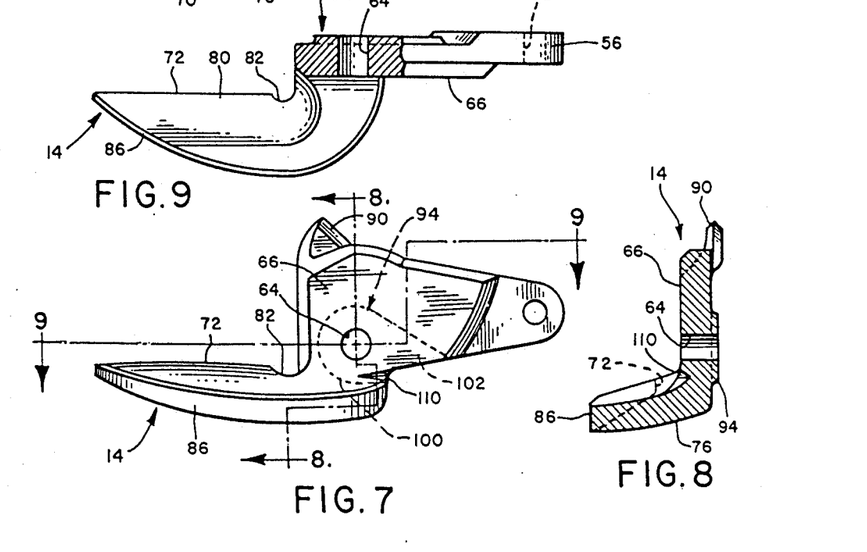
FIG. 7 is a side elevational view of the lower cutting blade of the offset snips of FIGS. 1 to 3.
FIG. 8 is a sectional view of the lower cutting blade of the offset snips of FIGS. 1 to 3 taken along the line 8—8 of FIG. 7.
FIG. 9 is a sectional view of the lower cutting blade of the offset snips of FIGS. 1 to 3 taken along the line 9—9 of FIG. 7.

Applicant has found that the cutting of the sheet material workpiece 22 is enhanced if the cutting surfaces 70 and 72 are curved in side elevation, as shown in FIGS. 4 and 7, so as to present convex cutting surfaces to the workpiece. In the preferred embodiment shown, the upper cutting surface 70 is defined by an 8 inch radius, and the lower cutting surface 72 is also defined by an 8 inch radius However, the configuration illustrated is merely illustrative as various other curved configurations could be utilized with similar effect. As is evident from FIGS. 4 to 8, forward portions 84 and 86 of the respective blade members 12 and 14 extend laterally nearly perpendicular to the shank portions 62 and 66. This configuration facilitates the cutting of a sheet material workpiece 22 which is placed upon a flat surface such as a table and, further, minimizes the amount that the cut surfaces of the workpiece must be spread apart as they pass above and below the lower blade member 14.

Preferably, the blade members 12 and 14 are hollow ground along the dorsal surfaces 78 and 80, respectively, to ensure that the upper and lower cutting surfaces 70 and 72 have a uniform width in side elevation while providing for resharpening of the blade members, as described below. The rearward portion of the lower cutting surface 72 is provided with a relief 82 to facilitate grinding of the cutting surface 72 and to ensure smooth sliding engagement of the cutting surfaces 70 and 72 during cutting. The forward portions 84 and 86 of the blade members 12 and 14 are curved inward as shown in FIGS. 6 and 9 to form convex surfaces. This configuration of the forward portions 84 and 86 provides sufficient strength for the cutting surfaces 70 and 72 while permitting the cutting snips 10 to be maneuvered for cutting when space is limited.

Cutting of the wire workpiece 24 is provided by engagement of an anvil portion 88 formed upon the shank of the upper blade member 12 by a chisel or wedge portion 90 formed upon the shank of the lower blade member 14. The placement of the anvil portion 88 and the wedge portion 90 is such that their engagement provides a stop to limit rotation of the blade members when the cutting snips 10 are in the closed position shown in FIG. 2. The wedge portion 90 serves as a chisel to sever a wire, rod, small bar or the like placed upon the anvil portion 88 when the cutting snips 10 are moved from the open position shown in FIG. 1 to the closed position of FIG. 2. It will be appreciated that other opposed cutting surfaces such as, for example, those of "diagonal" cutters may be used in place of the anvil portion 88 and the wedge portion 90 with similar effect.

It is an important feature of the present invention that the cutting surfaces 70 and 72 may be reground to renew worn or damaged cutting surfaces. Referring to FIG. 3, it will be apparent that grinding back either the upper cutting surface 70 or the lower cutting surface 72 would normally be expected to result in a lateral space between the cutting surfaces 70 and 72, thereby precluding shearing of the sheet material workpiece 22. The offset of the cutting surface 70 with respect to the shank portion 62 is decreased by such grinding, and the offset of the cutting surface 72 with respect to the shank portion 66 is increased by such grinding. For this reason, the commercially available offset snips cannot be conveniently resharpened once they become dull or damaged.

Resharpening of the cutting snips 10 of the present invention is facilitated by blade-to-blade pivot bosses, indicated generally by the numerals 92 and 94, upon the adjacent surfaces of the shank portions 62 and 66, respectively. The blade-to-blade pivot bosses 92 and 94 are flat projections above the surface of the shank portions 62 and 66 perpendicular to the main pivot bolt 16. The pivot boss 92 need not be of any particular configuration but, by way of example, may include a semi-circular forward portion 96 concentric with the main pivot bolt 16 and a rectangular rearward portion 98, as shown in FIG. 4. Similarly, by way of example, the pivot boss 94 may include a semi-circular forward portion 100 concentric with the main pivot bolt 16 and a triangular rearward portion 102 as indicated in FIG. 7. The blade-to-blade pivot bosses 92 and 94 provide improved bearing surfaces between the blade members 12 and 14 while maintaining alignment of the cutting surfaces 70 and 72. The rearward portions 98 and 102 cooperate to prevent the cutting surfaces 70 and 72 from spreading apart during the cutting stroke.

In the cutting snips 10, the offset of the cutting surfaces 70 and 72 is determined by the location of the pivot bosses 92 and 94. As a result, resharpening of the cutting snips 10 can be provided by grinding both the cutting surfaces 70 and 72 and the respective pivot bosses 92 and 94. It will be appreciated that no change in the offset of the upper cutting surface 70 will occur if equal thicknesses of material are ground from the upper cutting surface 70 and the pivot boss 92. Similarly, no change in the offset of the lower cutting surface 72 will occur if equal thicknesses of material are ground from the lower cutting surface 72 and the pivot boss 94. Thus, either or both of the blade members 12 and 14 may be sharpened as required without producing a lateral space between the cutting surfaces 70 and 72.

Resharpening of the respective blade members is further simplified because no curved surfaces require regrinding. The upper and lower cutting surfaces 70 and 72 are ground in a plane which is substantially parallel to the respective pivot bosses 92 and 94. The pivot bosses 92 and 94 may be machined first to provide reference surfaces for the grinding of the cutting surfaces 70 and 72. The hollow ground portions 78 and 80 of the respective blade members 12 and 14 eliminate the need to grind any other surfaces during resharpening. Applicant has found that sufficient regrinding capability is provided if the height of the pivot bosses 92 and 94 above the adjacent shank portions 62 and 66 is 1/32 of an inch. The articulation of the blade members 12 and 14 with respect to the handles 18 and 20 permits the cutting surfaces 70 and 72 to be positioned in a grinding fixture with the pivot bolts 26, 40 and 42 in place, only the main pivot bolt 16 having been removed.

Applicant has found that the cutting of the sheet material workpiece 22 is enhanced if the upper and lower cutting surfaces 70 and 72 are not exactly parallel with respect to the pivot bosses 92 and 94 but, instead, are angled slightly so as to establish progressive interference as the blade members are closed. Although various amounts of interference may be used with similar effect, Applicant prefers an angle of approximately 15 minutes on each of the cutting surfaces 70 and 72 so as to establish a total interference of approximately one-half a degree. This interference forces the blades tightly together during the latter part of the cutting stroke to ensure a shearing action. The desired angle and offset can be conveniently and economically formed when the blade members 12 and 14 are initially ground or subsequently reground to effect resharpening.

It will be appreciated that grinding of the pivot bosses 92 and 94 is merely illustrative of the inventive concept of removing material from the adjacent shank portions 62 and 66 of the upper and lower blade members 12 and 14 to Permit resharpening of the cutting surfaces 70 and 72. Milling or other cutting means could also be employed in place of grinding provided that such cutting means is not precluded by the hardness of the blade members 12 and 14.

Another feature is the locking means which can be engaged manually to prevent the cutting snips 10 from opening from the closed position shown in FIG. 2. The pivot bolt 40 is formed with a shoulder portion between the shank portion and the head portion. A lock strap 104 is pivotably mounted upon the pivot bolt 42 outside the laterally spaced side portions 44 and 46 of the upper and lower handles 18 and 20. The free end of the lock strap 104 is notched in a side portion thereof so as to form a hook surface 106. The lock strap 104 is moveable manually between the pivot bolt 40 and the handle pivot 26 from a first position shown in FIG. 1 which permits operation of the cutting snips 10 to a second position shown in FIG. 2 which locks the cutting snips 10 in the closed position. In the second position, the hook surface 106 of the free end of the lock strap 104 is rotated into engagement with the shoulder portion of the pivot bolt 40 such that the lock strap 104 is held in compression by the omega spring 50. The lock strap 104 may conveniently be released or engaged by the operator's thumb to permit one-hand operation.

It is another important feature of the cutting snips 10 that a triangular notch or recess 110 is provided in the shank portion 66 of the lower blade member 14 in line with the path of the cut sheet material workpiece 22 passing above the forward portion 86 of the lower blade member 14. The recess 110 permits the cutting snips 10 to cut right-hand as well as left-hand turning cuts. It will be appreciated that the configuration of the cutting snips 10 shown in the preferred embodiment is particularly suited for straight and left-hand turning cuts. However, applicant has found that the recess 110 permits right-hand turning cuts having a 4 inch or larger diameter, thereby eliminating the need for separate cutting snips particularly adapted for right-hand turning cuts. Similar cutting snips could be provided having a mirror image configuration which would be particularly suited for straight and right-hand turning cuts yet capable of 4 inch diameter left-hand turning cuts.

It is still another important feature of the cutting snips 10 that the handles 18 and 20 are particularly convenient and adapted for applying force throughout the range of motion of the cutting blades 12 and 14. Unlike more conventional offset snips, the handle pivot bolt 26 is relatively close to the hand grips 32 and 34. As a result, the angle formed between the hand grips 32 and 34 when the cutting snips 10 are in the open position shown in FIG. 1 can be greater than that of conventional snips. In the open position, the forward portions of the hand grips 32 and 34 are spaced apart to permit the handles 18 and 20 to be spanned by the operator's hand adjacent the ear portions 36 and 38 for maximum leverage. The lower handle 20 is configured such that the open position of the lower hand grip 34 does not interfere with a work-bench upon which the sheet material workpiece 22 is placed for cutting. As the upper and lower blade members 12 and 14 are moved toward the overclosed position shown in FIG. 2, the more rearward portions of the upper and lower hand grips 32 and 34 are, progressively, ideally spaced apart for maximum leverage. In addition, the blade members 12 and 14 and the handles 18 and 20 comprise a four bar linkage which provides amplification in transmitting the manually applied force to the cutting surfaces 70 and 72 to reduce operator exertion and fatigue.

A variety of materials may be used to form the blade members and the handles, depending upon the sheet material to be cut. In the preferred embodiments shown, the cutting blades are forged to alloy tool steels and are ground to the configurations shown. Such construction provides sufficient strength to permit steel sheet to be cut by the cutting snips. However, other materials and less expensive forming methods may be used, particularly when less substantial sheet material is to be cut. The handles 18 and 20 may be conveniently and economically formed of mild steel by various stamping operations. The lock strap 104 may also be conveniently and economically formed of sheet steel.

Figure 10:
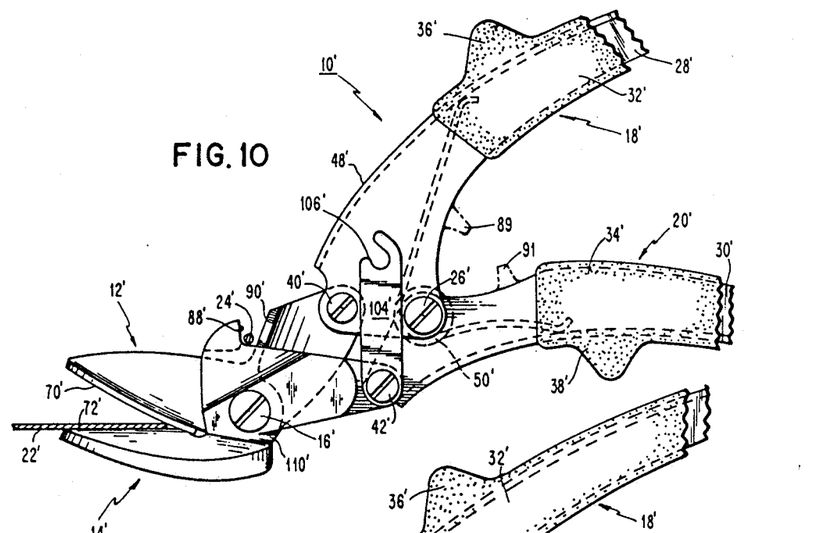
FIG. 10 is a side elevational view of a more preferred embodiment the offset snips of the present invention shown in the open position and with portions broken away.

Referring now to FIGS. 10 to 19, an improved all-way offset snips cutting tool with an improved wire cutter is indicated generally by the reference numeral 10'. The snips 10' include upper and lower blade members 12' and 14', bolt 16' by upper and lower handles, indicated generally by the numerals 18' and 20', respectively. Movement of the blade members 12' and 14' between the open position shown in FIG. 10 and the closed position shown in FIG. 11 effects cutting of a sheet material workpiece 22' or a wire workpiece 24' positioned between the blade members 12' and 14', as shown in FIG. 10.

The handles 18' and 20' are pivotably moveable about a handle pivot bolt 26' located intermediately of the ends of the handles 18' and 20'. The rearward portions 28' and 30' of the respective handles 18' and 20' are covered with upper and lower hand grips 32' and 34', respectively. Preferably, the hand grips 32' and 34' are formed by dipping or molding so as to include outwardly projecting ear portions 36' and 38', respectively, to prevent the hand of the operator from sliding forward during use of the cutting snips 10'.

Figures 11, 12:
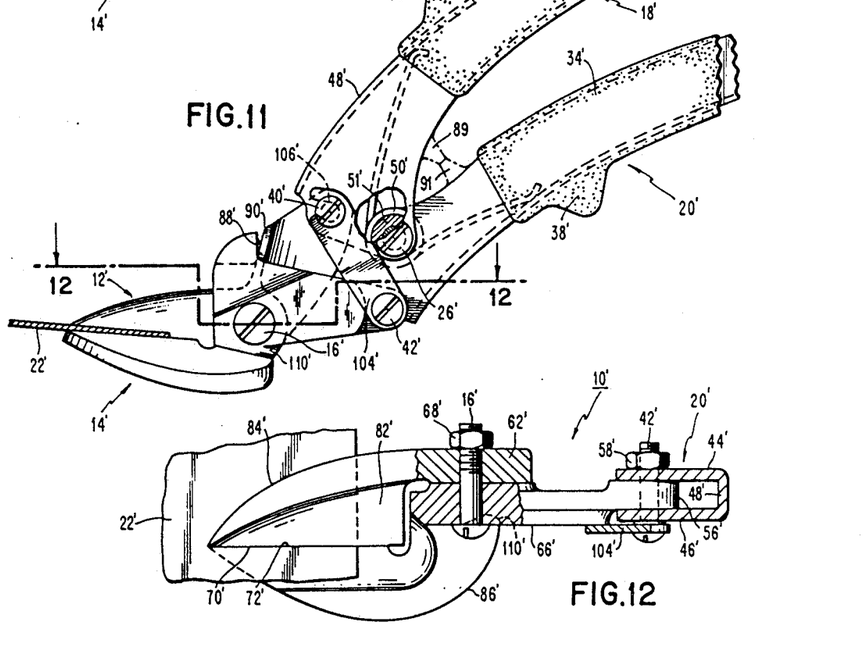
FIG. 11 is a side elevational view of the offset snips of FIG. 10 shown locked in the closed or cutting position and with portions broken away.
FIG. 12 is a sectional view of the offset snips of FIGS. 10 and 11 along the line 12—12 of FIG. 11.

The handles 18' and 20' extend forward from the handle pivot bolt 26' and away from each other for pivotable mounting to the blade members 12' and 14' at pivot bolts 40' and 42', respectively. In the open position shown in FIG. 10, an acute angle is, preferably, formed between an imaginary line joining the pivot bolts 25' and 40' and an imaginary line joining pivot bolts 26' and 42'. Such an acute angle is in the order of about 70 degrees in both embodiments of the invention. However, in the closed position, said angle between the two equally long imaginary lines is preferably increased by about 10 degrees to about 15 degrees (114 degrees to 119 degrees) resulting in a substantially more powerful grip due to the shallower toggle "linkage" and the general linearity of the toggle pivot points when the offset snips are in a closed position. With the pivot bolts 40' and 42' closer to the handle pivot bolt 26', the latter is much more closer to dead center where power is maximum for the toggle mechanism. Thus, in this embodiment of the invention, the distance between the handle pivot bolt 26' and the pivot bolts 40' and 42' is about ¼ inch less which results in an improved offset snips of considerably greater power than that of the embodiment shown in FIGS. 1 to 8. Here in the closed position, the two opposite equal angles of the triangular "overcenter" type toggle mechanism form angles with the further imaginary line joining pivot bolts 40' and 42' in the order of about 30 degrees to about 33 degrees. Preferably, the handles 18' and 20' have a U-shaped cross-section, as shown in FIG. 12, formed by laterally spaced side portions 44' and 46' joined by a web portion 48'. An omega spring 50', held in place by the handle pivot bolt 26', engages the web portion 48' of the handles 18' and 20' to bias the cutting snips 10' into the open position. Other biasing means could also be employed with this embodiment of the invention, and, although the "centering" sleeve 51' is not essential to the operation of the cutting snips 10', the sleeve 51' substantially extends the cycle life of the omega spring 50'.

In the open position, the upper blade member 12' extends upward and rearward from the main pivot bolt 16' to a pivotable mounting upon the pivot bolt 40' as shown in FIG. 10. The lower blade member 14' extends rearward from the main pivot bolt 16' to a pivotable mounting upon the pivot bolt 42'. In response to the closing of the handles 18' and 20', the pivot bolts 40' and 42' are rotated about the handle pivot bolt 26', thereby spreading the rearward portions 54' and 56' of the blade members 12' and 14'. As illustrated in FIG. 12, the rearward portions 54' and 56' have sufficient thickness to be closely received by the side portions 44' and 46' of the handles 18' and 20' so as to maintain alignment of the upper and lower cutting blades 12' and 14'. Adjustment of the play between the side portions 44' and 46' and the rearward portions 54' and 56' is provided by adjustment nuts 58' upon the pivot bolts 40' and 42'.

Figures 13, 14:
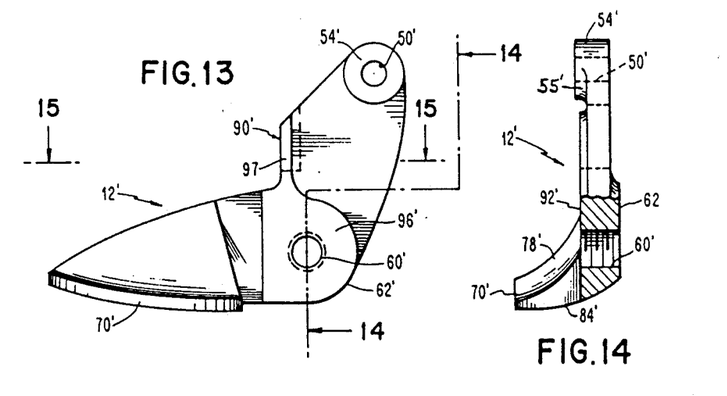
FIG. 13 is a side elevational view of the upper cutting blade of offset snips of FIGS. 10 to 12.
FIG. 14 is a sectional view of the upper cutting blade of the offset snips of FIGS. 10 to 12 taken along the line 14—14 of 13.

The main pivot bolt 16' is threaded into a hole 60' in the shank portion 62' of the upper blade member 12' and forms a sliding fit with a hole 64' within the shank portion 66' of the lower blade member 14'. A lock nut 68 is locked against the shank portion 62' to maintain the adjusted length of the main pivot bolt 16. Cutting surfaces 70' and 72' of the cutting blades 12' and 14', respectively, are within a plane substantially parallel to but offset laterally from the adjoining shank portions 62' and 66' of the respective blade members, as shown in FIG. 13. It will be noted that the offset in this embodiment of the invention is extended sufficiently to easily permit a cut portion of the sheet material workpiece 22' to pass to the side of the shank portion 66', but more importantly, to enable the improved tool to cut down to an opposing circle of about 2.0" to 2.5" in diameter. This arrangement permits one to cut sheet metal for most jots with a single tool as the "super" extended offset blades enable not only straight line cuts, but also sharp curves in either left or right hand directions.

It is shown in FIGS. 13 and 14 that limited extending portion 55' protrudes from one side of an upper part of the rearward portion 54' of the upper blade member and surrounds the opening 50'.

Figures 16, 17:
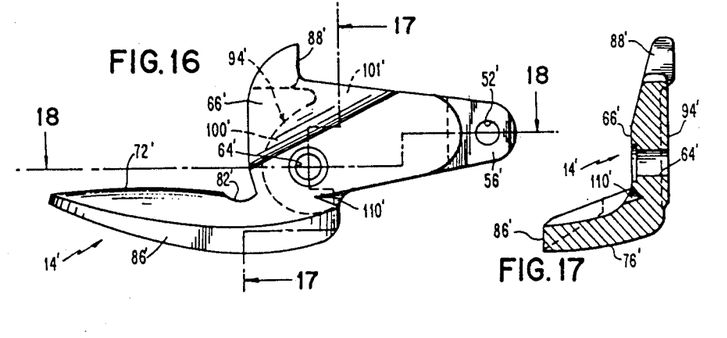
FIG. 16 is a side elevational view of the lower cutting blade of the offset snips of FIGS. 10 to 12.
FIG. 17 is a sectional view of the lower cutting blade of the offset snips of FIGS. 10 to 12 taken along the line 17—17 of FIG. 16.

In this preferred embodiment of the invention, the cutting surfaces 70' and 72' are also similarly curved in side elevation with like radii, as shown in FIGS. 13 and 16, so as to present convex cutting surfaces to the workpiece. Also, the forward portions 84' and 86' of the respective blade members 12' and 14' extend laterally nearly perpendicular to the shank portions 62' and 66', as in the embodiments of FIGS. 1 to 9.

Figures 15, 18, 19A, 19B:
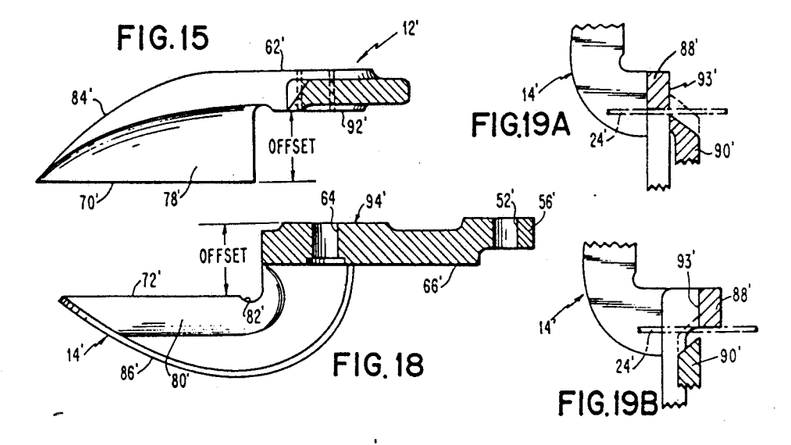
FIG. 15 is a sectional view of the upper cutting blade of the offset snips of FIGS. 10 to 12 taken along the line 15—15 of FIG. 13.
FIG. 18 is a sectional view of the lower cutting blade of the offset snips of FIGS. 10 to 12 taken along the line 18—18 of FIG. 16.
FIGS. 19a and 19b are fragmentary top views of opposing shearing blades of typical shear type cutters which may, if desired, be employed in lieu of the pinch cutter.

Preferably, the blade members 12' and 14' are hollow ground along the surfaces 78' and 80', respectively, to ensure that the upper and lower cutting surfaces 70' and 72' have a uniform width in side elevation while providing for resharpening of the blade members, as described below. The rearward portion of the lower cutting surface 72' is provided with a relief 82' to facilitate grinding of the cutting surface 72' and to ensure smooth sliding engagement of the cutting surfaces 70' and 72' during cutting. The forward portions 84' and 86' are curved inward as shown in FIGS. 15 and 18 to form convex surfaces. This configuration of the forward portions 84' and 86' provides sufficient strength for the cutting surfaces 70' and 72' while permitting the cutting snips 10' to be maneuvered for cutting when space is limited.

Cutting of the wire workpiece 24' is provided by engagement of an anvil portion 88' formed upon the lower blade member 14' by a chisel or wedge portion 90' formed upon the upper blade member 12'. The placement of the anvil portion 88' and the wedge portion 90' is such that their engagement provides a stop to limit rotation of the blade members when the cutting snips 10' are in the closed position shown in FIG. 11. The wedge portion 90' serves as a chisel to sever a wire, rod, small bar or the like placed upon the anvil portion 88' when the cutting snips 10' are moved from the open position shown in FIG. 10 to the closed position in FIG. 11. It will be appreciated that the opposed cutting surfaces cut wire by means of pinch cutting which is preferable to other cutting means, such as shear cutting, as a separate limit stop is not required. With shear cutting surfaces in the form of "scissor-like" cutting blades between portions of the opposite blade members, the snips would also require a pair of mating abutments 89 and 91 (limit stop) between the handle blades for limiting rotation of the blade members (as best shown in phantom in FIGS. 10 to 11). Such a limit stop is necessary in each of the embodiments of FIGS. 19a and 19b where shear type wire cutters are substituted for pinch type wire cutters. With a shear type cutter of FIG. 19a employed, the anvil portion 88' is simply ground down to clear the cutting blade or chisel 90' and movement of the chisel 90' (shown in phantom) past the opposing shear edge 93' cuts the wire (also shown in phantom). In FIG. 19b, the opposing shear edge 93' is outwardly offset as the sharp cutting edge of the shear blade or chisel 90' is disposed at an angle opposite to that of the chisel 90' shown in FIG. 19a.

With either a pinch cutter or the shears type cutter, no relief is required at the base of the cutter elements as the chisel or knife edges are all sharpened by grinding across the full face of the cutter elements With the improved snips of the invention, only a single grinding pass need be made to form either type of cutter as the cutters are formed by grinding an angled or beveled edge from a straight edge. Thus, such a knife edge or shear blade formed thereby can be substantially smaller in angle size and therefore considerably more sharper than a more conventional blunt V-shaped angled pinch cutter For example, approximately a 70 degree angle is provided in the chisel of FIGS. 1 to 9, whereas in the preferred embodiment an angle of about 40 degrees to about 60 degrees is satisfactory. It is believed that considerably less friction is generated during cutting with the small angled cutter of the present invention as compared to the earlier pinch cutter. In such cases, the blade members are inherently made of stronger steels in order to maintain a sharp cutting edge or edges. Preferably, an angle of about 50 degrees has been found to be suitable for the practice of the invention. It should also be appreciated that with a blunt angle of 70 degrees for the V-shaped pinch cutter FIGS. 1 to 9, greater forces are required to pinch or cut wire as the wider wedge-shaped chisel is believed to generate considerably more frictional resistance to cutting.

It shall be recognized that with the full face width cutters of the present invention, very small wires can be easily cut as there is no "relief" at the base of any cutter. Thus, the small wire can be positioned anywhere along the cutting edge or anvil, be it the pinch or shears type, with out any fear that the small wire will be hung-up in a "relief" at the base of the cutter or anvil and either not be cut or incompletely cut. With such situations, one must then accurately reposition the wire in the center of the cutter in order to recut the wire in another spot, or finish the incomplete cut at the same spot, or to recut as close to the first attempt as one could conceivably achieve without the aid of any special tools to accurately align the cutter up for a "second" bite at the wire.

It is an important feature of the present invention that the cutting surfaces 70' and 72' may be reground to renew worn or damaged cutting surfaces. Referring to FIG. 12, it will be apparent that grinding back either the upper cutting surface 70' or the lower cutting surface 72' would cutting surfaces 70' and 72', thereby precluding shearing of the sheet material workpiece 22'. The offset of the cutting surface 70' with respect to the shank portion 62' is decreased by such grinding, and the offset of the cutting surface 72' with respect to the shank portion 66' is increased by such grinding. For this reason as noted hereinbefore, commercially available offset snips cannot be conveniently resharpened once they become dull or damaged.

Resharpening of the cutting snips 10' of the present invention is facilitated by pivot bosses, indicated generally by the numerals 92' and 94', upon the adjacent surfaces of the shank portions 62' and 66', respectively. The pivot bosses 92' and 94' are flat projections above the surface of the shank portions 62' and 66' perpendicular to the main pivot bolt 16'. The pivot boss 92' in the preferred embodiment is of particular configuration in that it includes a portion 96' generally concentric with the main pivot bolt 16' and a generally slender rectangular upward portion 97, as shown in FIG. 13. Pivot boss 94' includes a generally circular portion 100 concentric with the main pivot bolt 16' and a generally upwardly extending portion 101, as indicated in FIG. 16. The pivot bosses 92' and 94' provide improved bearing surfaces between the blade members 12' and 14' while maintaining alignment of the cutting surfaces 70' and 72'. The upward portions 97 and 101 also respectively reinforce the strength of the anvil portion 88' as well as the chisel 90' itself.

In the cutting snips 10', the offset of the cutting surfaces bosses 70' and 72' is determined by the location of the pivot bosses 92' and 94'. As a result, resharpening of the cutting snips 10' can be provided by grinding both the cutting surfaces 70' and 72' and the respective pivot bosses 92' and 94' (and their upward portions 97 and 101 as well). It will be appreciated that no change in the offset of the upper cutting surface 70' will occur if equal thicknesses of material are ground from the upper cutting surface 70' and the pivot boss 92'. Similarly, no change in the offset of of material are ground from the lower cutting surfaces 72' and the pivot boss 94'. Thus, either or both of the blade members 12' and 14' may be resharpened as is periodically required during normal use without producing a lateral space between the cutting surfaces 70' and 72'.

Resharpening of the respective blade members is further simplified because no curved surfaces require regrinding. The upper and lower cutting surfaces 70' and 72' are ground in a plane which is substantially parallel to the respective pivot bosses 92' and 94'. The pivot bosses 92' and 94' may be machined first to provide reference surfaces for the grinding of the surfaces 70' and 72'. The hollow ground portions 78' and 80' of the respective blade members 12' and 14' eliminate the need to grind any other surfaces during resharpening. Applicant has found that sufficient regrinding capability is provided if the height of the pivot bosses 92' and 94' above the adjacent shank portions 62' and 66' is 1/32 of an inch. The articulation of the blade members 12' and 14' with respect to the handles 18' and 20' permits the cutting surfaces 70' and 72' to be positioned in a grinding fixture with the pivot bolts 26', 40' and 42' in place, only the main pivot bolt 16' having been removed.

As noted hereinabove, the cutting of the sheet material workpiece 22' is enhanced if the upper and lower cutting surfaces 70' and 72' are not exactly parallel with respect to the pivot bosses 92' and 94' but, instead, are angled slightly so as to establish progressive interference as the blade members are closed. Although various amounts of interference may be used with similar effect, applicant prefers an angle of approximately 15 minutes on each of the cutting surfaces 70' and 72' so as to establish a total interference of approximately one-half a degree. This interference forces the blades tightly together during the latter part of the cutting stroke to ensure a shearing action; and the angle and offset desired is formed when the blade members 12' and 14' are initially ground or subsequently reground to effect resharpening.

Suitable locking means which can be engaged manually to prevent the cutting snips 10 from opening from the closed position is shown in FIG. 11. The pivot bolt 40' is formed with a shoulder portion between the shank portion and the head portion. A lock strap 104', is pivotably mounted upon the pivot bolt 42' outside the laterally spaced side portions 44' and 46' of the upper and lower handles 18' and 20'. The free end of the lock strap 104' is notched in a side portion thereof so as to form a hook surface 106'. The lock strap 104' is moveable manually between the pivot bolt 40' and the handle pivot bolt 26' from a first position shown in FIG. 1 10 which permits operation of the cutting snips 10' to a second position shown in FIG. 11 which locks the cutting snips 10' in the closed position. In the second position, the hook surface 106' of the free end of the lock strap 104' is rotated into engagement with the shoulder portion of the pivot bolt 40' such that the lock strap 104' is held in compression by the omega spring 50'. The lock strap 104' may conveniently be released or engaged by the operator's thumb Although the cutting surfaces 70' and 72' of the blade members 12' and 14' are considerably offset from the pivot bosses so as to provide all-way offset snips capable of cutting small opposing circles of the order of about 2.0" to 2.5" diameters, a triangular notch or recess 110' may still be provided in the shank portion 66' of the lower blade member 14' in line with the path of the cut sheet material workpiece 22' passing above the forward portion 86' of the lower blade member 14'. The recess 110' aids in permitting the cufting snips 10' to cut righthand as well as left-hand turning cuts. It will be appreciated that both configurations of the cutting snips shown are particularly suited for straight and left-hand turning cuts, but that the improvement shown in FIGS. 10 to 19 also can cut equally as well in a right-hand turning cut, say in cases where a small circle or sharp curve is experienced in the opposite direction from the tool's normal orientation. Thus, the embodiment of FIGS. 10 to 19 permits right-hand turning cuts of almost 2.0" to 2.5" in diameter; consequently eliminating for all intensive purposes the need for separate cutting snips particularly adapted for right-hand turning cuts.

Another feature of the cutting snips 10' is that the handles 18' and 20' are particularly convenient and adapted cutting blades 12' and 14'. Unlike conventional offset snips, the handle pivot bolt 26' is disposed close to the hand grips 32' and 34', but at the same time it is about ⅛ inch closer to the pivot bolts 40' and 42' as compared to that of FIGS. 1 to 9. As a result, the angle formed between the hand grips 32' and 34' when the cutting snips 10' are in the open position shown in FIG. 10 is greater than that of conventional snips, as well as that of FIGS. 1 to 9. With the pivot bolts 40' and 42' disposed closer to the pivot bolt 26', the angle between "imaginary toggle links" between the pivot bolt 26' and each of said pivot bolts 40' and 42' is preferably in the order of about 115 degrees to about 120 degrees, and more preferably about 117 degrees with the snips in a closed position. With such construction, a more powerful snips is achieved inasmuch as the center point of the three piece "toggle" linkage arrangement more closely approaches dead center where the three pivot points would form a straight line (maximum power).

In the open position, the forward portions of the hand grips 32' and 34' are spaced apart to permit the handles 18' and 20' to be spanned by the operator's hand adjacent the ear portions 36' and 38' for maximum leverage. The lower handle 20' is configured such that the open position of the lower hand grip 34' does not interfere with a work-bench upon which the sheet material workpiece 22' is placed for cutting. As the upper and lower blade members 12' and 14' are moved toward the closed position shown in FIG. 11, the more rearward portions of the upper and lower hand grips 32' and 34' are progressively, ideally spaced apart for maximum leverage.

Of course, it should be understood that various changes and modifications to the preferred embodiments described above will be apparent to those skilled in the art. For example, rivets or other pivot means may be employed in place of the four bolts without affecting the operation of the cutting snips. It is therefore intended that the foregoing detailed description be regarded as illustrative rather than limiting and that it be understood that it is the following claims, including all equivalents, that are intended to define the scope of this invention.

We claim:

1. Universal offset snips for cutting sheet metal and for cutting wire having an upper blade member with a shank, a flat blade-to-blade pivot boss and a first cutting surface, and having a lower blade member with a shank, a flat blade-to-blade pivot boss and a second cutting surface, the first and second cutting surfaces being offset with respect to the plane of the blade-to-blade pivot bosses; and having blade-to-blade pivot means pivotably connecting the upper and lower blade members at the flat bosses for rotation about an axis perpendicular to the pivot bosses by opposed handle means pivoting the upper and lower blade members about said pivot means, so that the first and second cutting surfaces are movable between an open position and a closed position for cutting sheet metal therebetween; comprising:

an upwardly extending front shank portion of the blade-to-blade pivot boss of the upper blade member forming a bevelled chisel edge of a wire cutter, so positioned that removal of material from the flat pivot boss during sharpening also sharpens the bevelled chisel edge; an upwardly extending front shank portion on the lower blade member adapted as an opposing anvil surface engaging with the bevelled chisel edge upon closing the handles;

both the blade-to-blade pivot bosses and the cutting surface are adapted for simultaneous removal of material therefrom during resharpening the cutting surfaces while maintaining the offset therebetween as the pivot bosses serve as reference surfaces during resharpening of the offset snips; and whereby the opposing anvil surface and the bevelled chisel edge counteract any misalignment of the blade members in forming a pinch-type wire cutter and together also act as a limit stop to the travel of the cutting surfaces of said upper and lower blade members so that the offset snips are capable of making small opposing circle cuts down to about two to two and one-half inches in diameter in any direction.

2. The universal offset snips according to claim 1, wherein said chisel has an angled knife-like edge of about 40 degrees to about 60 degrees.

3. The universal offset snips according to claim 3, wherein said chisel has an angled knife-like edge of about 50 degrees.

4. The universal offset snips according to claim 3, wherein said opposite handle means include a pivot joint therebetween, and pivot connections with said upper and lower blade members, so that a three point toggle linkage is formed between said opposite handle means and said blade members; and the pivot joint angle formed by said pivot joint and each closed position is about 115 degrees to about 120 degrees, whereby greater power is achieved by said offset snips due to said pivot joint approaching dead center between said pivot connections.

5. The universal offset snips according to claim 4, wherein the pivot angle is about 117 degrees.

6. The universal offset snips according to claim 1, wherein said upwardly extending portion of said first pivot boss forms an opposing shear edge resembling said chisel to shear past opposing shear edge, whereby said wire cutter is a shear-type cutter.

7. The universal offset snips according to claim 6, including mating abutments on said opposite handle means for providing a limit stop to the travel of said first and second cutting surfaces of said upper and lower blade members.

8. The universal offset snips according to claim 7, wherein said chisel is an angled knife-like edge of about 40 degrees to about 60 degrees.

9. The universal offset snips according to claim 8, wherein said chisel has an angled knife-like edge of about 50 degrees.

10. The universal offset snips according to claim 9, wherein said opposite handle means include a pivot joint therebetween, and pivot connections with said upper and lower blade members, so that a three point toggle linkage is formed between said opposite handle means and said blade members; and the angle formed by said pivot joint and each of said pivot connections when said blade members are in a closed position is achieved by said offset snips due to said pivot joint approaching dead center between said pivot connections.

11. The universal offset snips according to claim 10, wherein the pivot joint angle is about 117 degrees.

12. The universal offset snips according to claim 1, wherein such upwardly extending portion of said first pivot boss is an anvil, and said wire cutter is a pinch-type cutter with said anvil and said chisel serving simultaneously as a limit stop to the travel of said first and second cutting surfaces of said upper and lower blade members.

13. Universal offset snips for cutting sheet metal and for cutting wire having an upper blade member with a shank, a flat blade-to-blade pivot boss and a first cutting surface, and having a lower blade member with a shank, a flat blade-to-blade pivot boss and a second cutting surface, the first and second cutting surfaces being offset with respect to the plane of the blade-to-blade pivot bosses; and having blade-to-blade pivot means pivotably connecting the upper and lower blade members at the flat bosses for rotation about an axis perpendicular to the pivot bosses by opposed handle means pivoting the upper and lower blade members about said pivot means, so that the first and second cutting surfaces are movable between an open position and a closed position for cutting sheet metal therebetween; comprising:

an upwardly extending front shank portion of the blade-to-blade pivot boss of the upper blade member forming a bevelled chisel edge of a wire cutter, so positioned that removal of material from the flat pivot boss during sharpening also sharpens the bevelled chisel edge; an upwardly extending front shank portion on the lower blade member adapted as an opposing anvil surface engaging with the bevelled chisel edge upon closing the handles;

both the blade-to-blade pivot bosses and the cutting surface are adapted for simultaneous removal of material therefrom during resharpening the cutting surfaces while maintaining the offset therebetween as the pivot bosses serve as reference surfaces during resharpening of the offset snips;

said upper blade member having a rearward portion, a limited extending portion protruding at least from one side of an upper part of the rearward portion, said handle means being pivotably connected to the upper blade member, said pivotal connection having an opening in the rearward portion and a pivoting member, said limited extending portion surrounding said opening in the rearward portion, engagement between said handle means and at least one side of said upper blade portion is limited to said extending portion substantially reducing friction forces generated during operation of the universal offset snips; and whereby the opposing anvil surface and the bevelled chisel edge counteract any misalignment of the blade members in forming a pinch-type wire cutter and together also act as a limit stop to the travel of the cutting surfaces of said upper and lower blade members so that the offset snips are capable of making small opposing circle cuts down to about two to two and one-half inches in diameter in any direction.

* * * * *

UNITED STATES PATENT AND TRADEMARK OFFICE
CERTIFICATE OF CORRECTION

PATENT NO. : 4,967,475
DATED : November 6, 1990
INVENTOR(S) : James R. O'Keeffe, et al.

It is certified that error appears in the above-identified patent and that said Letters Patent is hereby corrected as shown below:

Col. 15, line 33, change "surface" to --surfaces--, and delete "simultaneous";

Col. 15, line 34, change "during" to --for--;

Col. 16, line 58, change "surface" to --surfaces--, and delete "simultaneous";

Col. 16, line 59, change "during" to --for--.

Signed and Sealed this

Seventeenth Day of March, 1992

Attest:

HARRY F. MANBECK, JR.

*Attesting Officer*     *Commissioner of Patents and Trademarks*